US008622072B2

(12) United States Patent
Lovell

(10) Patent No.: US 8,622,072 B2

(45) Date of Patent: Jan. 7, 2014

(54) APPARATUS TO CONTROL FLUID FLOW

(75) Inventor: Michel Ken Lovell, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 900 days.

(21) Appl. No.: 12/629,559

(22) Filed: Dec. 2, 2009

(65) Prior Publication Data

US 2010/0139781 A1 Jun. 10, 2010

Related U.S. Application Data

(60) Provisional application No. 61/201,059, filed on Dec. 5, 2008.

(51) Int. Cl.
*F16K 31/34* (2006.01)

(52) U.S. Cl.
USPC .............................................. 137/85; 137/415

(58) Field of Classification Search
USPC ................................ 137/82, 84–86, 412–415
See application file for complete search history.

(56) References Cited

U.S. PATENT DOCUMENTS

| | | | | |
|---|---|---|---|---|
| 2,966,927 | A | 1/1961 | Peters | |
| 3,105,508 | A | 10/1963 | Bowditch et al. | |
| 3,120,241 | A * | 2/1964 | Parks | 137/413 |
| 3,265,308 | A | 8/1966 | Hopkins | |
| 3,273,348 | A | 9/1966 | Hart, Jr. | |
| 3,353,559 | A | 11/1967 | Phillips | |
| 3,389,886 | A | 6/1968 | Tissot-Dupont | |
| 3,550,426 | A | 12/1970 | Griffo | |
| 3,566,899 | A | 3/1971 | Bowditch | |
| 3,584,652 | A | 6/1971 | Huntington et al. | |
| 3,592,230 | A | 7/1971 | Piroutek | |
| 3,878,376 | A | 4/1975 | Sholes, Jr. et al. | |
| 3,927,563 | A | 12/1975 | Konomi | |
| 4,263,838 | A * | 4/1981 | St. Laurent, Jr. | 137/85 |
| 4,304,250 | A | 12/1981 | Snyder | |
| 4,474,053 | A | 10/1984 | Butler | |
| 4,512,365 | A | 4/1985 | Jacobs et al. | |
| 4,700,738 | A * | 10/1987 | Frese et al. | 137/85 |
| 4,875,502 | A | 10/1989 | Romano | |
| 4,962,666 | A | 10/1990 | Adney et al. | |
| 4,974,625 | A | 12/1990 | Paullus et al. | |

(Continued)

FOREIGN PATENT DOCUMENTS

EP 1168115 A1 1/2002

OTHER PUBLICATIONS

International Searching Authority, "International Search Report," issued in connection with international application serial No. PCT/US2009/066605, mailed Mar. 22, 2010, 3 pages.

(Continued)

*Primary Examiner* — Eric Keasel

(74) *Attorney, Agent, or Firm* — Hanley, Flight & Zimmerman, LLC.

(57) ABSTRACT

Apparatus to control a fluid flow are disclosed. An example fluid flow control apparatus described herein includes a signal stage comprising a signal stage relay having a supply plug being operatively connected to a valve seat at a first end and an exhaust seat at a second end and a seal operatively coupled to the supply plug such that the seal provides a feedback area to apply a fluid pressure feedback force to the exhaust seat.

19 Claims, 5 Drawing Sheets

(56) References Cited

U.S. PATENT DOCUMENTS

| | | | | |
|---|---|---|---|---|
| 4,993,256 | A | 2/1991 | Fukuda | |
| 5,047,965 | A | 9/1991 | Zlokovitz | |
| 5,158,111 | A | 10/1992 | Lambert et al. | |
| 5,367,888 | A | 11/1994 | Muston et al. | |
| 5,388,607 | A | 2/1995 | Ramaker et al. | |
| 5,563,335 | A | 10/1996 | Howard | |
| 5,636,653 | A | 6/1997 | Titus | |
| 5,762,102 | A | 6/1998 | Rimboym | |
| 5,983,706 | A | 11/1999 | Marks et al. | |
| 6,238,910 | B1 | 5/2001 | Custance et al. | |
| 6,240,955 | B1 * | 6/2001 | Anderson et al. | 137/85 |
| 6,280,408 | B1 | 8/2001 | Sipin | |
| 6,378,356 | B1 | 4/2002 | Ruiz et al. | |
| 6,382,923 | B1 | 5/2002 | Gray | |
| 6,497,246 | B1 | 12/2002 | Nicewarner et al. | |
| 6,550,314 | B2 | 4/2003 | Summers et al. | |
| 6,553,810 | B2 | 4/2003 | Webb et al. | |
| 6,678,584 | B2 | 1/2004 | Junk et al. | |
| 6,722,185 | B2 | 4/2004 | Lawson et al. | |
| 6,796,324 | B2 | 9/2004 | Dilger et al. | |
| 6,892,756 | B2 | 5/2005 | Schulze | |
| 6,997,202 | B2 | 2/2006 | Olander | |
| 7,392,822 | B2 * | 7/2008 | Kimmell | 137/415 |
| 7,818,092 | B2 | 10/2010 | Lovell et al. | |
| 8,091,580 | B2 * | 1/2012 | Gentry | 137/415 |
| 2003/0182999 | A1 | 10/2003 | Kouno | |
| 2003/0189492 | A1 | 10/2003 | Harvie | |
| 2004/0112435 | A1 | 6/2004 | Olander | |
| 2004/0149436 | A1 | 8/2004 | Sheldon | |
| 2005/0056316 | A1 | 3/2005 | McCarty | |
| 2006/0041335 | A9 | 2/2006 | Rossi et al. | |
| 2007/0169564 | A1 | 7/2007 | Lovell et al. | |
| 2007/0246101 | A1 | 10/2007 | Kimmell | |

OTHER PUBLICATIONS

International Searching Authority, "Written Opinion of the International Searching Authority," issued in connection with international application serial No. PCT/US2009/066605, mailed Mar. 22, 2010, 8 pages.

International Bureau, "International Preliminary Report on Patentability," issued in connection with international application serial No. PCT/US2009/066605, issued Jun. 7, 2011, 9 pages.

European Patent Office, "Office Communication," issued in connection with European application serial No. 09 768 286.8, issued Sep. 27, 2012, 3 pages.

United States Patent and Trademark Office, "Non-Final Office Action," issued in connection with U.S. Appl. No. 11/336,558, on Dec. 12, 2007 (6 pages).

United States Patent and Trademark Office, "Non-Final Office Action," issued in connection with U.S. Appl. No. 11/336,558, on Jul. 22, 2008 (21 pages).

United States Patent and Trademark Office, "Final Office Action," issued in connection with U.S. Appl. No. 11/336,558, on Apr. 16, 2009 (9 pages).

United States Patent and Trademark Office, "Non-Final Office Action," issued in connection with U.S. Appl. No. 11/336,558, on Jun. 2, 2009 (20 pages).

United States Patent and Trademark Office, "Final Office Action," issued in connection with U.S. Appl. No. 11/336,558, on Dec. 9, 2009 (25 pages).

United States Patent and Trademark Office, "Notice of Allownce," issued in connection with U.S. Appl. No. 11/336,558, on Sep. 10, 2010 (10 pages).

Fairchild Industrial Products Company, "Fairchild Model 4000A Pneumatic Precision Regulator Installation, Operation and Maintenance Instructions," Jul. 2002 (2 pages).

Norriseal, "Series 1001, 1001A and 1001XL Level Controllers," Product Manual, 2006 (16 pages).

Emerson Process Management, "Type 4660 High-Low Pressure Pilot," Instruction Manual, Feb. 2006 (20 pages).

Emerson, "L2sj Low Emission Liquid Level Controller," Product Manual, 2008 (4 pages).

Emerson Process Management, "Type L2 Liquid Level Controllers," Instruction Manual, Apr. 2005 (16 pages).

Patent Cooperation Treaty, "International Search Report," issued by the International Searching Authority in connection with PCT application No. PCT/US2006/047104, mailed Jun. 20, 2007 (2 pages).

Patent Cooperation Treaty, "Written Opinion of the International Searching Authority," issued by the International Searching Authority in connection with PCT/US2006/047104, mailed Jun. 20, 2007 (7 pages).

Patent Cooperation Treaty, "International Preliminary Report on Patentability," issued by the International Bureau in connection with PCT/US2006/047104, mailed Jul. 22, 2008 (8 pages).

* cited by examiner

APPARATUS TO CONTROL FLUID FLOW

CROSS REFERENCE TO RELATED APPLICATION

This patent claims the benefit of U.S. Provisional Patent Application Ser. No. 61/201,059, filed on Dec. 5, 2008, entitled APPARATUS TO CONTROL FLUID FLOW, which is incorporated herein by reference in its entirety.

FIELD OF THE DISCLOSURE

This disclosure relates generally to fluid flow control devices and, more particularly, to apparatus to control fluid flow.

BACKGROUND

Industrial processing plants use control devices in a wide variety of applications. For example, a level controller may be used to manage a final control mechanism (i.e. valve and actuator assembly) to control the level of a fluid in a storage tank. Many process plants use a compressed gas, such as compressed air, as a power source to operate such control devices. In certain hydrocarbon production facilities, compressed air is generally not readily available to operate the control devices. Natural gas is often used as the supply gas to operate these control devices. However, many control devices may bleed natural gas to the atmosphere, which is costly due to the value of the natural gas and the environmental controls and regulations associated with such exhaust gases. Thus, minimizing or eliminating the bleed of natural gas to the atmosphere by the control devices is an important concern.

It is generally understood that typical level controllers used in the hydrocarbon production industry may be single stage, low-bleed pneumatic devices operated by natural gas. To minimize the consumption of natural gas during operation, such level controllers are designed to include a dead band to reduce amounts of bleed gas. However, such designs generally have low operational sensitivity or gain resulting in large vessel spans or oversized sensors.

It is also common to improve the gain of such single stage devices by fashioning a dual-stage pneumatic control device to produce the desired response characteristic with higher output sensitivity. The first stage, often called the signal stage, converts a mechanical or fluid pressure input signal to a pressure output. The signal stage has a low volume flow rate and a low-pressure output that provides the response and control characteristics for the desired process control application. A second stage, often called the amplifier stage, provides high pneumatic capacity and responds to the output of the signal stage to achieve the desired response characteristics while providing a higher output flow rate and/or pressure necessary to operate the final control mechanism. Many of these devices do not provide control action proportional to an input signal and/or suffer from excessive loss of supply gas, such as natural gas, during operation.

FIG. 1 and FIG. 2 illustrate a known direct-acting, dual-stage pneumatic control device 1 that includes a reverse-acting signal stage A comprising a signal stage valve 110 coupled to a reverse-acting amplifier stage B having an amplifier stage relay 10 (as explained in greater detail below). In operation, an input signal (such as a motion or displacement) from a mechanical device, such as a linkage connected to a displacer in a fluid tank (not shown), may be applied to a valve stem tip 135 of the signal stage valve 110 to initiate a pneumatic control signal to the amplifier stage relay 10. However, it should be appreciated by those of ordinary skill in the art that the input signal might also be derived from any number of well-known inputs including pressure signals and other direct mechanical forces.

The amplifier stage relay 10 of the amplifier stage B is the four-mode pneumatic relay disclosed in U.S. Pat. No. 4,974,625, which is hereby incorporated by reference herein in its entirety. Those desiring more detail should refer to U.S. Pat. No. 4,974,625. This relay provides user selectable direct or reverse and proportional or snap-acting operational modes. One of ordinary skill in the art appreciates that a direct or reverse acting mode refers to the relationship of the output signal with respect to an input signal such that, for example, direct mode means the output signal increases with an increasing input signal. Whereas a proportional or snap-acting mode refers to the response of the output signal such that, for example, proportional means changes in the output signal are substantially linear with respect to an input signal change and snap-acting means changes in the output signal are bi-stable and non-linear with respect to an input signal change.

Although the pneumatic relay disclosed in U.S. Pat. No. 4,974,625 may provide four modes, the dual-stage pneumatic control device 1 illustrated in FIG. 1 and FIG. 2 may disadvantageously utilize only two modes of operation—direct and reverse/snap-acting modes. This is because the dual-stage pneumatic control device 1 provides very little feedback or proportioning force between the amplifier stage relay 10 and the signal stage valve 110. That is, there is no specific mechanism to feedback output pressure from a signal diaphragm 90 of the amplifier stage relay 10 to offset the applied input force at the valve stem tip 135 of the signal stage valve 110.

In general, the amplifier stage relay 10 of the control device 1 includes a series of input and output ports that communicate with respective chambers formed within the amplifier stage relay 10. By selectively controlling the fluid communication between various input and output ports through the user selectable switches, the single amplifier stage relay 10 may provide the multiple operational modes previously described to interface with various control elements.

Referring to FIG. 2, to accommodate the operational modes in the amplifier stage relay 10, an input port 11 communicates with a chamber 15 and an output port 12. A pressure outlet 17 communicates with a chamber 16; an input port 13 communicates with a chamber 18, an output port 14 communicates with chamber 20 and the pressure outlet 17 may be connected to a final control mechanism such as a valve and actuator assembly (not shown).

FIG. 1 shows a cut-away illustration of the port switches of the amplifier stage B of the control device 1 used to select the various operational modes. First and second generally triangular-shaped port switches 70 and 72 are pivotally mounted on the amplifier stage relay 10 by pins 71 and 73, respectively. The port switches 70 and 72 are sectioned to reveal serpentine channels 74 and 76, respectively, which pneumatically couple the various input and output ports of the amplifier stage relay 10 from a pressure inlet 78 and the pressure outlet 17 to provide alternate modes of operation. As illustrated in FIG. 1, the first port switch 70 is positioned such that the input port 13 is in communication with the pressure inlet port 78, and the input port 11 is vented to atmosphere. The second port switch 72 is shown to vent the output port 14. It should be appreciated from U.S. Pat. No. 4,974,625 that this switch configuration places the amplifier relay stage 10 in a reverse/snap-acting mode, which when combined with the reverse-acting signal stage valve 110 provides a direct/snap-acting pneumatic control device 1.

That is, a decrease in pressure in a chamber 88 results in movement of a cage assembly 59 to the left with respect to FIG. 2, which provides an increasing output pressure at the pressure outlet 17. Thus, in operation when an increasing input signal moves the stem tip 135 of the signal stage valve 110, the reverse-acting mode of the signal stage valve 110 provides a decrease in its output pressure in passageway 82 and consequently a decrease in pressure in the chamber 88 to provide a direct-acting pneumatic control device 1. The alternate switch configuration for the control device 1 couples the input port 11 to the pressure inlet port 78 and the input port 13 is vented to atmosphere with the second port switch 72 configured to couple port 14 to the output port 12. This alternate configuration places the amplifier stage relay 10 in a direct/snap-acting mode and, therefore, the pneumatic control device 1 operates in a reverse/snap-acting mode. The remaining possible switch configurations for the amplifier stage relay 10 render the relay inoperable because there is no feedback mechanism present in the described embodiment of control device 1.

As shown in FIG. 2, the signal stage valve 110 includes a single plug 130, a first valve seat 120 and a second valve seat 122. In a first state, a first plug end 132 does not engage the first valve seat 120 and a second plug end 134 engages the second valve seat 122. In a second state, the first plug end 132 engages the first valve seat 120 and the second plug end 134 does not engage the second valve seat 122. In an intermediate state, neither plug end 132 and 134 engages either of the respective valve seats 120 and 122.

In operation, a linkage may apply a force to the valve stem tip 135 to move it toward the amplifier relay 10 or to the right (with reference to FIG. 1 and FIG. 2). The rightward movement of the valve stem tip 135 causes movement of the stem 130 of the signal stage valve 110 that results in the first plug end 132 and the second plug end 134 being simultaneously separated from their respective first and second valve seats 120 and 122 in the intermediate state. During this separation, the supply gas, such as natural gas, from a supply port 85 is vented or bled through the second valve seat 122 to the atmosphere past valve stem tip 135. This venting to atmosphere of the supply gas is often called transition bleed, which may cause excessive loss of supply gas, such as natural gas, to the atmosphere. When the rightward movement of the stem 130 continues, the stem 130 ultimately engages the first plug end 132 with the first valve seat 120 and the transition bleed ceases, and the fluid pressure within a through feedback passage 114 of the signal stage valve 110 and the chamber 88 of the amplifier stage relay 10 is at atmospheric pressure.

The change from supply gas pressure to atmospheric pressure within the chamber 88 results in the diaphragm cage assembly 59 being moved toward the left in FIG. 2 by a spring 48 in the chamber 16. The cage assembly 59 includes a valve seat 30 and valve plug 40. The leftward movement of the valve seat 30 and the valve plug 40 causes a valve plug 38 to engage a valve seat 42 and terminate the transmission of supply gas to the output port 12. The valve seat 30 is then moved away from the valve plug 40 as the diaphragm cage assembly 59 moves to the left so that fluid pressure in the chamber 16 flows through the T-shaped opening to the chamber 18 to vent the fluid pressures from the chambers 16 and 18.

While the use of the signal stage valve 110 with the amplifier stage relay 10 provides sensitivity to the input signal from the linkage, it also provides a significant transition bleed of natural gas during the operation of the dual-stage pneumatic control device 1. It should also be appreciated that one way to reduce the transition bleed and maintain most of the gain of the dual-stage pneumatic control device 1 is to couple together two amplifier stage relays 10 for serial operation. However, coupling the two amplifier stage relays 10 together to create a tandem device increases the cost and results in a relatively larger, dual-stage pneumatic control device 1.

In addition, while certain designs may provide a feedback force to the above-described device, it may be less desirable. One approach is to provide a diaphragm between the stem 130 and the valve body 112 in the signal stage valve 110. However, the diaphragm has to be clamped or retained at its inner and outer diameters, which results in a larger signal stage that subsequently requires undesirable changes in the linkage and the displacer.

SUMMARY

An example fluid flow control apparatus described herein includes a signal stage comprising a signal stage relay having a supply plug being operatively connected to a valve seat at a first end and an exhaust seat at a second end and a seal operatively coupled to the supply plug such that the seal provides a feedback area to apply a fluid pressure feedback force to the exhaust seat.

In yet another example, a dual-stage fluid flow control apparatus described herein includes a signal stage having a proportional output, the signal stage comprising a signal stage relay including a supply plug having a first end adjacent a valve seat and a second end adjacent an exhaust seat, a signal stage input post is adapted to couple the signal stage to a control device, and means for urging a seat load across the supply plug toward either the valve seat or the exhaust seat. An amplifier stage comprising an amplifier stage relay is operatively connected to the signal stage via a signal passage, the amplifier stage having a fluid supply responsive member adapted to move a relay member to provide an amplified fluid supply output such that a shift in the seat load across the valve seat and the exhaust seat provides a predetermined engagement of either the valve seat to the first end of the supply plug or the exhaust seat to the second end of the supply plug to provide either a proportional or snap-acting and a direct or reverse acting output of the amplifier stage relative to an input signal at the signal stage input post.

In yet another example, a fluid flow control apparatus described herein includes a signal stage having a proportional output. The signal stage comprises a signal stage relay including a supply port, a supply plug having a first end adjacent a valve seat and a second end adjacent an exhaust seat, a signal stage input post adapted to couple the signal stage to a control device and means for urging a seat load across the supply plug toward either the valve seat or the exhaust seat. An amplifier stage comprising an amplifier stage relay is operatively connected to the signal stage via a signal passage. The amplifier stage relay having a fluid supply responsive member adapted to move a relay member to provide an amplified fluid supply output such that a shift in the seat load across supply plug of the signal stage closes the exhaust seat of the signal stage prior to opening the valve seat of the signal stage to substantially eliminate a transition bleed in the signal stage.

DETAILED DESCRIPTION

In general, the example apparatus and methods described herein may be utilized for controlling fluid flow in various types of fluid flow processes. An example fluid flow control apparatus includes a dual-stage fluid control device having a compact, low bleed signal stage with proportional output to improve the control of fluid flow. Additionally, while the examples described herein are described in connection with the control of product flow for the industrial processing industry, the examples described herein may be more generally applicable to a variety of process control operations for different purposes.

Figure 2:
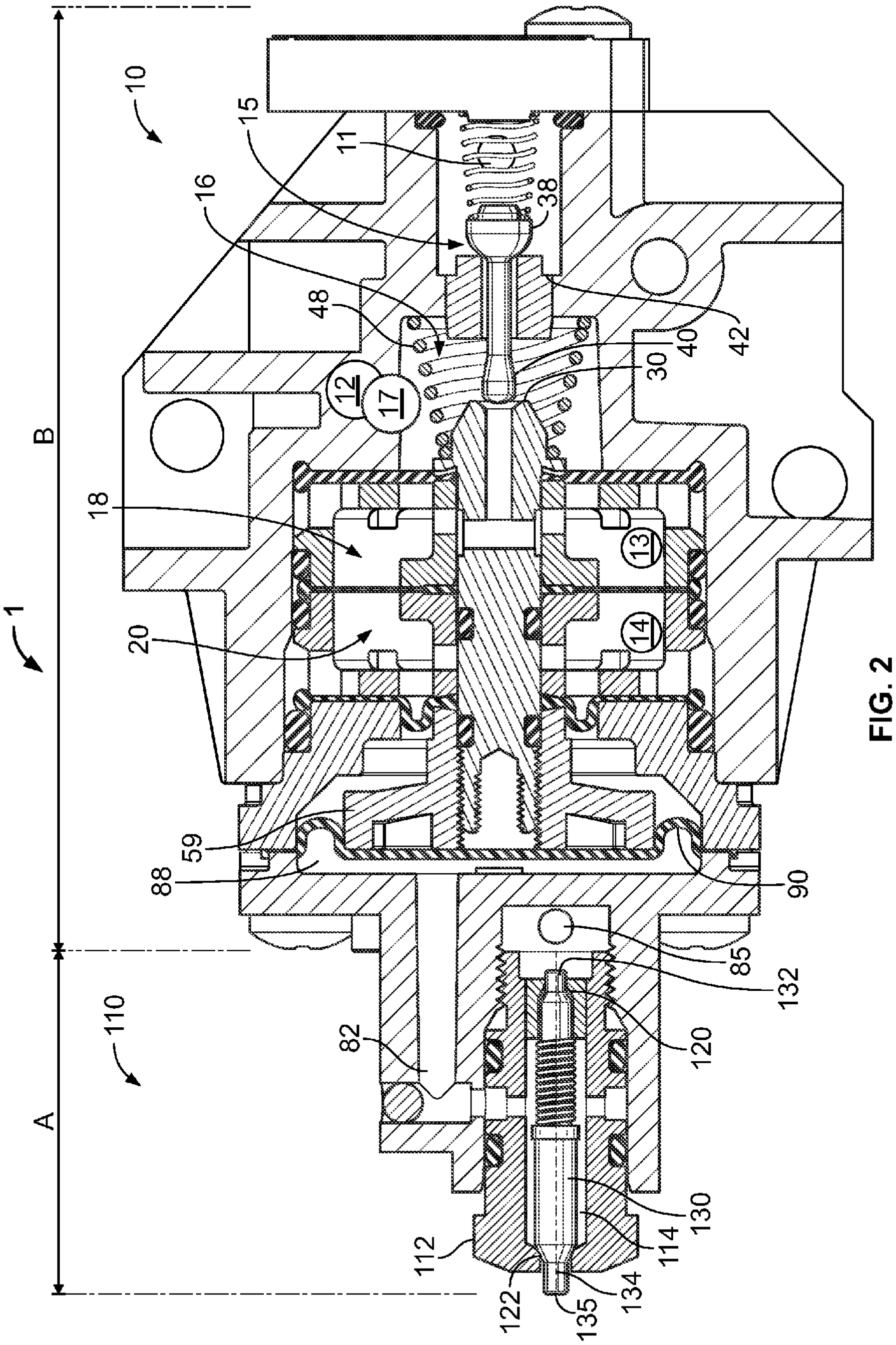
FIG. 2 (Prior Art)
FIG. 2 is a cut-away illustration of a known dual-stage, direct-acting pneumatic control device.
Figure 3:
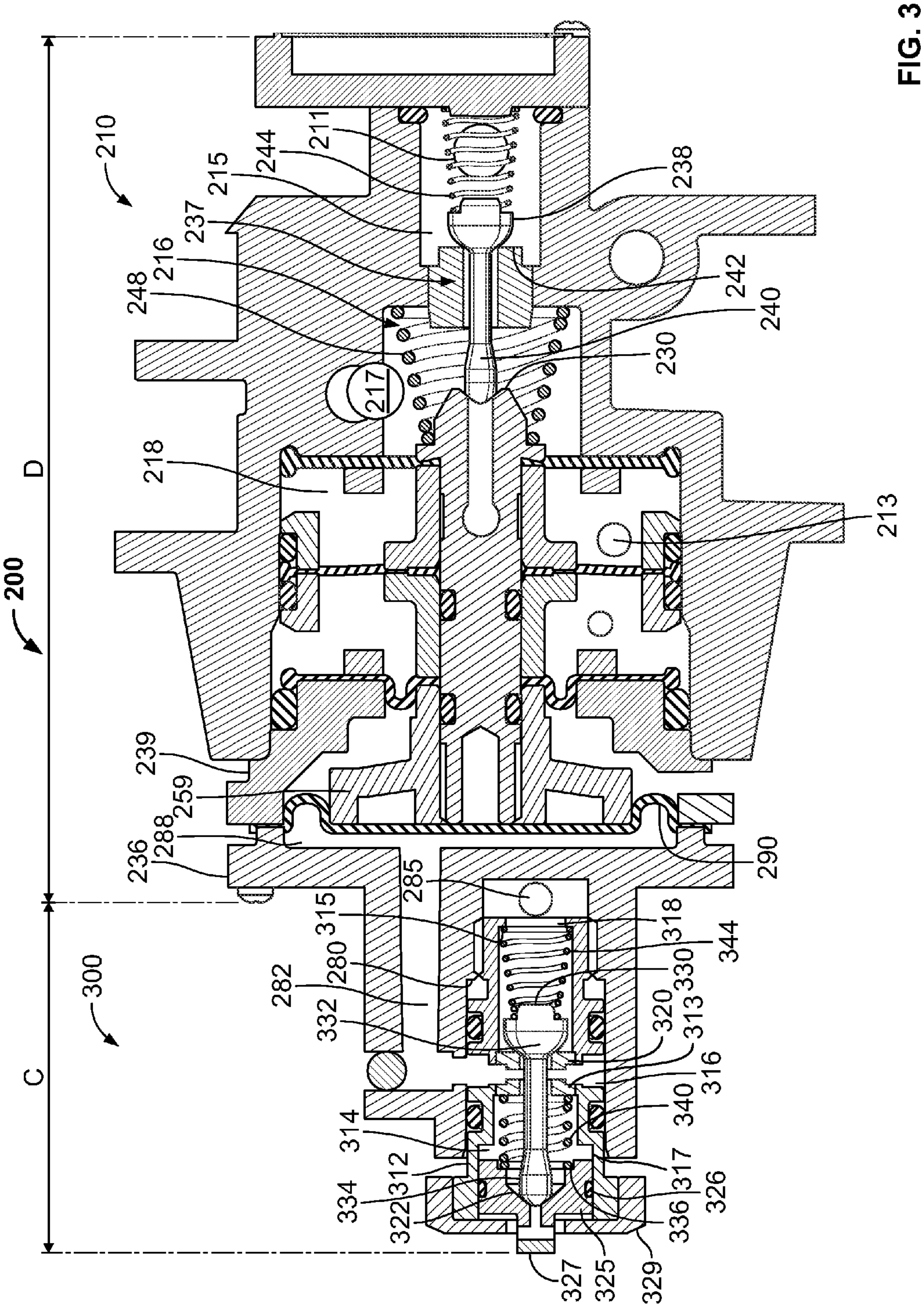
FIG. 3 is a cut-away illustration of an example dual-stage, direct-acting pneumatic control device at a quiescent operating point.

FIG. 3 is a cut-away illustration of an example direct-acting dual-stage pneumatic control device 200 comprising a signal stage having signal stage relay 300 and an amplifier stage further comprising an amplifier stage relay 210. The direct-acting signal stage relay 300 provides a signal stage C and the direct-acting amplifier stage relay 210 provides an amplifier stage D of the example dual-stage pneumatic control device 200. The amplifier stage relay 210 of the amplifier stage D is similar to the four-mode pneumatic relay valve disclosed in the U.S. Pat. No. 4,974,625 and the amplifier stage relay 10 disclosed in FIG. 2, including the port switches 70 and 72 illustrated in FIG. 1. Those components in the amplifier stage relay 210 of FIG. 3 that are the same as or similar to the components in the amplifier stage relay 10 of FIG. 2 have the same reference numerals increased by 200.

Figure 1:
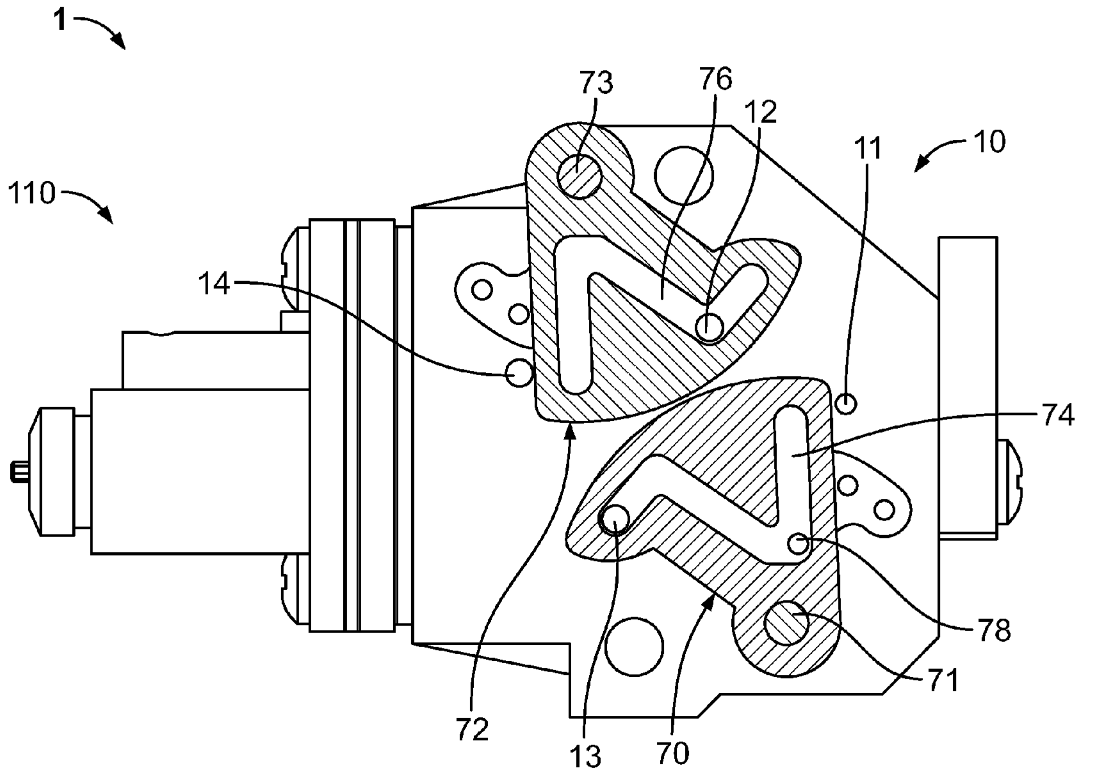
FIG. 1 (Prior Art)
FIG. 1 is a cut-away illustration of port switches of the amplifier stage of the dual-stage pneumatic control device of FIG. 2.

As described in detail below, it should be appreciated by those of ordinary skill in the art that the signal stage relay 300 improves the operation of the previously described dual-stage relay illustrated in FIG. 1 and FIG. 2 by providing a throttling or proportioning action, thereby permitting utilization of the four modes available in the amplifier stage relay 210 while substantially reducing the transition bleed associated with signal stage valve 110. A throttling or proportional/direct mode of operation is described below as an example operation of the control device 200. Those desiring more detail or description should refer to U.S. Pat. No. 4,974,625, which describes therein the other three modes of operation of a four-mode pneumatic relay valve similar to the amplifier 210 of FIG. 3.

Referring to FIG. 3, the signal stage relay 300 of the signal stage C includes a relay body 312 having a through feedback passage 314, a transverse port 316, an inlet 318, a first valve seat 320, and a second valve seat 322. The second valve seat 322 is located on an exhaust seat 325 having a seal or an o-ring 326 engaging and sealing against an inner surface 317 of the through feedback passage 314. As described in greater detail below, the o-ring 326 provides an effective area on which fluid pressure in the feedback passage 314 of the signal stage relay 300 may act to create a feedback force to provide the throttling or proportioning action in the control device 200.

It should be appreciated that at a quiescent point in the throttling or proportional mode, valve plugs 330, 240 and 238 are in a "closed" position. That is, closed position means the valve is "substantially in contact with" the valve seat. However, one skilled in the art appreciates that for such a valve seating surface, for example, a metal-to-metal valve seat arrangement, in a closed position with the limited seat loads available such valve-seat arrangements are known to leak small quantities of fluid (i.e. not bubble tight). This leakage at the seats yields a fluid flow to provide throttling action of the pneumatic control device in operation. That is, unlike a snap-acting operation wherein the valves are substantially moving into and out of contact with the valve seats, a throttling or proportional mode is, in part, defined by shifts in corresponding seat load to modify a pressure balance across the relay components. The shifting seat loads provide a modification in seat leakage during quiescent operation to shift the pressure balance across the signal stage C and the amplifier stage D in proportion to supply input and sensor feedback. It should also be appreciated that other materials of construction having sufficient hardness will yield similar leakage flows during operation.

As shown in FIG. 3, the exhaust seat 325 has an input post 327 and is retained within the through feedback passage 314 by an end cap 329. The supply valve plug 330 is located in the through feedback passage 314 and includes a first plug end 332 adjacent (e.g., situated immediately adjacent) the first valve seat 320 and a second plug end 334 adjacent (e.g., situated immediately adjacent) the second valve seat 322. The exhaust seat 325 includes a shoulder 336 that receives a spring 340. The spring 340 also engages a shoulder 313 to urge the exhaust seat 325 into engagement with the end cap 329 and away from the second plug end 334. A second spring 344 engages a valve body shoulder 315 and the first plug end 332 to urge the first plug end 332 into engagement with the first valve seat 320.

The signal stage relay 300 is positioned within an opening 280 in an end cover 236 of the amplifier stage relay 210. An end cover 236 includes a signal passage 282 that fluidly couples the transverse port 316 of the signal stage relay 300 with a signal chamber 288 defined partially by a signal diaphragm 290 located between the end cover 236 and an intermediate piece 239. The end cover 236 also includes a supply port 285 that provides supply gas to the inlet 318 of the signal stage relay 300.

In a quiescent operational mode, the first plug end 332 is in contact with the first valve seat 320 and the second plug end 334 is in contact with the second valve seat 322. A supply gas is provided to the signal stage relay 300 via the supply port 285 and the inlet 318. The first plug 332 is seated at the first valve seat 320 with sufficient seat load so that the supply gas is substantially prohibited from passing the first valve seat 320 and the seat load of the second plug end 334 is seated at the second valve seat 322 of the exhaust seat 325 so supply gas is substantially prohibited from exhausting from the exhaust seat 325. However, as previously explained, in throttling or proportional mode, at a quiescent operating point, both first and second valve plug ends 332 and 334, when engaged with the respective valve seats 320 and 322, substantially prohibit fluid flow, with only a leakage flow present. The slight leakage creates a proportional, shifting pressure balance across the signal and amplifier stages C and D to modify the respective seat loads in proportion to the supply fluid wherein a feedback force is coupled through a linkage connected to a displacer in a fluid tank (not shown). The input signal may be derived from any number of well-known inputs including pressure signals and direct mechanical forces.

For example, the supply plug 330 is shown in its left most position, with respect to FIG. 3, in contact with the first valve seat 320. In operation, such as a level control application, a buoyant force is applied to a displacer by a fluid in the fluid tank, an input or mechanical linkage provides an input force to the input post 327 of the exhaust seat 325. The input force or signal increases the leakage flow across the first valve seat

320. This action also causes the seat load of the second valve seat 322 to sealingly engage the second plug end 334 and decrease leakage flow through feedback passage 314 to the atmosphere, and then the first plug end 332 to increase leakage flow from the first valve seat 320 to enable a limited quantity of supply gas to enter the feedback passage 314.

Subsequently, the supply gas from the supply port 285 passes through the inlet 318, the first valve seat 320, through the feedback passage 314 to the transverse port 316, the signal passage 282 and the signal chamber 288 to act upon the signal diaphragm 290. The pressure of the supply gas increases a force supplied by the signal diaphragm 290 and a diaphragm cage assembly 259, thereby increasing a seat load upon a valve seat 230 from the valve plug 240 to decrease a leakage flow therebetween. This pressure also acts upon the inner surface 317 of the o-ring 326 to apply a negative feedback force on the linkage to provide a proportional output from the control device 200. That is, a force equal to the product of the pressure within the signal passage 282 and the effective sealing area of the o-ring 326 (i.e. the cross-sectional area of the o-ring defined by the inner surface 317) is applied in opposition to the linkage force.

As the linkage applies the input signal to the input post 327 seating forces between the first plug end 332 and the first valve seat 320 are diminished or reduced, increasing supply gas pressure to the signal chamber 288. The amplifier stage relay 200 of the amplifier stage D has port switches (not shown) set for proportional/direct operation. Thus, supply gas is applied to an input port 211 and a chamber 215. A chamber 216 and an output port 217 are coupled to a final control device. The supply gas is contained within the chamber 215 as long as a leakage flow across a valve seat 242 is substantially reduced by the valve plug 238 to prohibit a pressure increase in the chamber 216 and the output port 217. As pressure increases in the signal chamber 288, the force generated by the signal diaphragm 290 and the diaphragm cage assembly 259 increases the seat load across the valve seat 230. As the seat load increases across the valve seat 230 and the valve plug 240 of a plug assembly 237, the seat load across the valve seat 242 and the plug 238 decreases. The decrease in seat load across the valve seat 242 and the plug 238 increases a leakage flow from the chamber 215 and subsequently into the chamber 216. The increase in flow and pressure communicate through the pressure outlet 217 and into the final control device.

Continuing in operation, as the seat load of the first plug end 332 and the first valve seat 320 decreases, the supply gas in the feedback passage 314 acts upon the exhaust seat 325 to offset the input signal applied to the input post 327 by the linkage and provide a proportional amount of supply gas pressure to the signal chamber 288. At equilibrium, the valve seat 230 of the amplifier stage relay 210 is in contact with the valve plug 240 and the valve seat 242 is in contact with the valve plug 238 with the seat loads in balance so that the output pressure at the pressure outlet 217 and the final control device is proportional to the input signal at the input post 327.

If the input signal at the input post 327 decreases, the force provided by the diaphragm cage assembly 259 decreases so that the seat load between the valve plug 238 and the valve seat 242 increases and the seat load between the valve seat 230 and the valve plug 240 decreases. In this state, the leakage flow between the valve seat 230 and the valve plug 240 enable the supply gas in the chamber 216 to pass through a T-shaped opening 232 to the chamber 218 and vent through an input port 213, which is exposed to the atmosphere. Changes in the input signal at the input post 327 results in a new equilibrium state for the amplifier stage relay 210 with the output pressure at the pressure outlet 217 being directly proportional to the input signal.

During operation, when the input force at the input post 327 decreases, the seat load at the second valve seat 322 decreases and the supply plug 330 is slightly loaded. That is, the seat load at the first plug end 332 of the supply plug 330 and the first valve seat 320 increases to decrease the leakage flow of supply gas through the first valve seat 320. The seat load at the second valve seat 322 of the exhaust seat 325 and the second plug end 334 of the supply plug 330 decreases. The decrease in seat load permits the supply gas in the signal chamber 288, the signal passage 282, the transverse port 316, and feedback passage 314 to vent through the second valve seat 322 to atmosphere.

The signal stage relay 300 enables the example dual-stage pneumatic control device 200 to have a high gain, a low transition bleed, and four modes of operation that achieve numerous advantages. For example, the spring 340 is utilized to overcome a frictional force created by the seal or O-ring 326 and to keep or maintain the input post 327 in contact with the input linkage, thereby ensuring that a dead band of operation does not occur during the operation of the linkage. In other words, the input post 327 is in contact with the input linkage such that a bias force of the spring 340 substantially maintains contact between the input linkage and the input post 327 to substantially eliminate a dead band between the input linkage motion and exhaust seat 325 motion. The high gain, four-modes of operation provided by the example dual-stage pneumatic control device 200 eliminate the need to use either two-serially aligned amplifier stage relays 210 to provide a high gain or a diaphragm between the exhaust seat 325 and the valve body 312 to provide a feedback force. The use of the seal or O-ring 326 (i.e., as opposed to the use of a diaphragm) to provide a supply gas pressure feedback force to the exhaust seat 325 enables the signal stage relay 300 to have a small diameter and, thus, a small and compact size. This also results in the example dual-stage pneumatic control device 200 being usable with a smaller displacer and lighter fluids in a fluid vessel, thereby minimizing the cost of the fluid vessel.

The example dual-stage pneumatic control device 200 utilizes the springs 244 and 248 of the amplifier stage relay 210 and the springs 344 and 340 of the signal stage relay 300 to assist in the control of the flow of the supply gas through or across the respective valve seats 242, 230 and 320 and 322. As a result, the example dual-stage pneumatic control device 200 may function at any orientation, including horizontal, vertical, and angled without compensating for the affects of gravity.

One skilled in the art should also appreciate that the feedback area, presented by the effective area of the o-ring 326 can also be adjusted by changing the internal diameter of the feedback passage 314 of the signal stage relay 300 and the external diameter of the seal or o-ring 326. That is, the signal stage relay housing 312 and the seal or o-ring 326 can be quickly changed or replaced as a replaceable single stage module that provides a predetermined feedback area to accommodate different types of services such as water, condensate or interface, which may provide or exert different linkage forces. For example, a relatively large feedback area (e.g. 0.1080 $in^2$) would be preferable for applications providing a large buoyant force (i.e. corresponding to fluid having an approximate specific gravity of 1.0), such as water. A slightly smaller feedback area (e.g. 0.0625 $in^2$) would accommodate applications providing a moderate buoyant force (i.e. corresponding to a fluid having an approximate specific gravity of 0.8) such as oil and a very small feedback area (e.g. 0.036 $in^2$)

would preferably accommodate an oil-to-water interface application with a small buoyant force (i.e. corresponding to fluids having an approximate differential specific gravity of 0.1). Specifically, one of ordinary skill in the art will recognize that this feature provides the user with an improved setup and calibration scenario for level control applications since the lever and the displacer need not be modified or replaced for these different applications.

The example dual-stage pneumatic control device 200 depicted in FIG. 3 may provide very high gain (i.e. increased responsiveness) and very low gas consumption during normal operation. However, in certain applications such high gain or responsiveness may create susceptibility to mechanical vibrations that may lead to instability in control. The source of this instability is generally the rapid application of a feedback force on a controller linkage by the signal stage of the pneumatic controller device. The example pneumatic control device 401 of FIG. 4 may substantially reduce such susceptibility by: 1) independently controlling the pressure to the signal stage relay; and 2) reducing the feedback area of signal stage relay.

Figure 4:
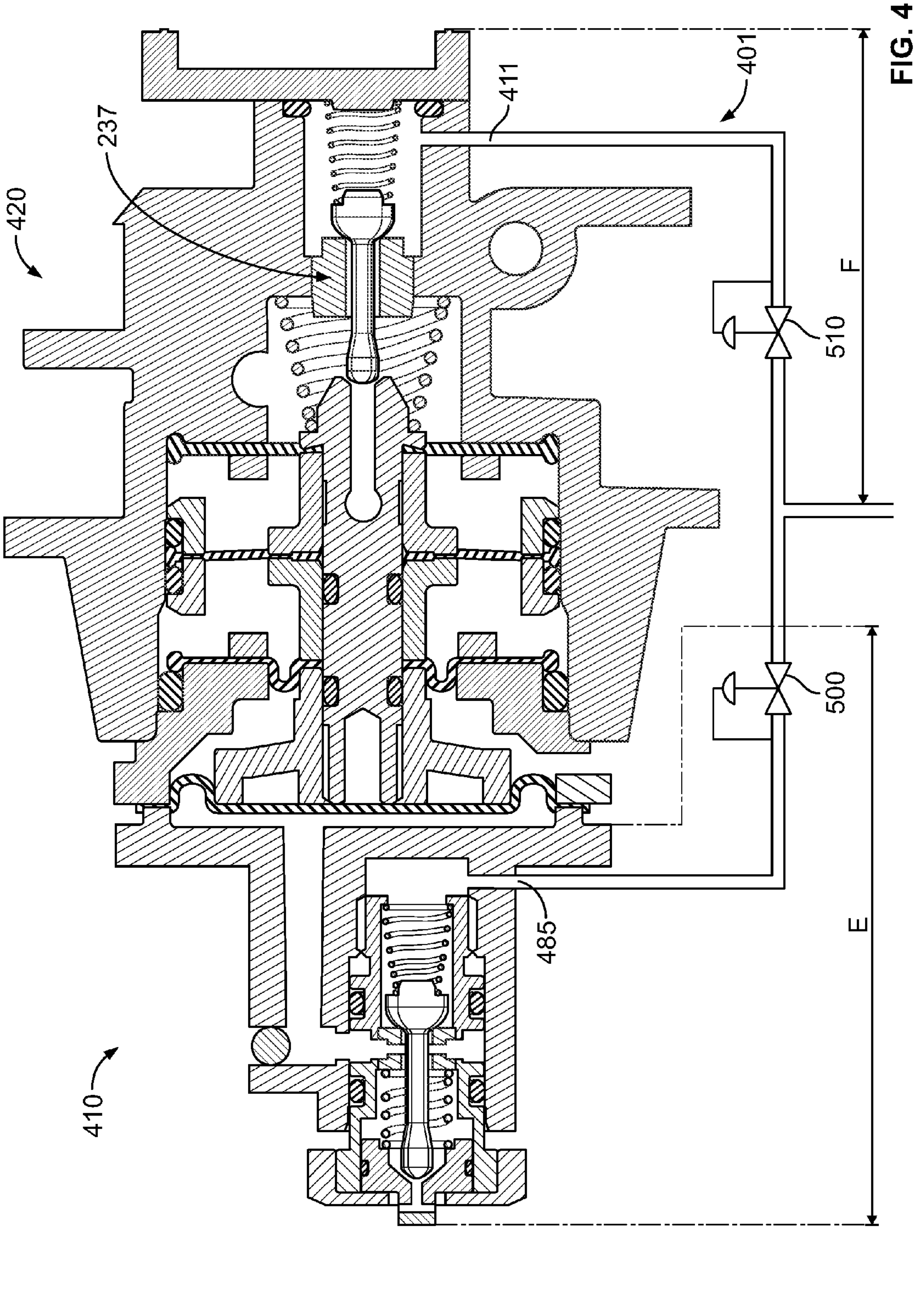
FIG. 4 is a cut-away illustration of an example dual-stage pneumatic control device with stabilizing pressure regulators.

Referring to FIG. 4, a cut-away illustration of an example dual-stage pneumatic control device 401 having a signal stage E and an amplifier stage F including stabilizing pressure regulators 500 and 510. The stabilizing pressure regulators 500 and 510 independently provide supply air to a signal stage relay 410 and an amplifier stage relay 420 through a signal supply pressure inlet 485 and an amplifier supply pressure inlet 411. It should be appreciated that such stabilizing pressure regulators 500 and 510 could be integrated within the signal stage E and the amplifier stage F, or such regulators could be external to the signal and amplifier stages E and F. Alternatively, it should be appreciated that stabilizing regulator 500 may be positioned downstream of stabilizing pressure regulator 510. The signal stage relay 410 and the amplifier stage relay 420 of example device generally function as the previously described example dual-stage pneumatic control device 200 depicted in FIG. 3 except the stabilizing pressure regulators 500 and 510 provide independent pressure supply to each stage, signal stage E and amplifier stage F to enhance device stability and to improve overall pneumatic control device performance. For example, the signal stage pressure regulator 500 may be set to 8 psig, whereas the amplifier stage pressure regulator 510 may be set to 35 psig. Generally, the signal stage E is set to a lower pressure than the amplifier stage F. That is, the signal stage pressure may be set at a minimal operating point to operate the amplifier stage F. The lower signal stage pressure improves pneumatic control device stability and performance in the following manner: 1) lower signal stage supply pressure directly reduces the feedback force that can be generated by the signal stage relay 410 (i.e. Force=Pressure×Area); and 2) lower pressure directly reduces the gas consumed by the signal stage relay 410.

Figure 5:
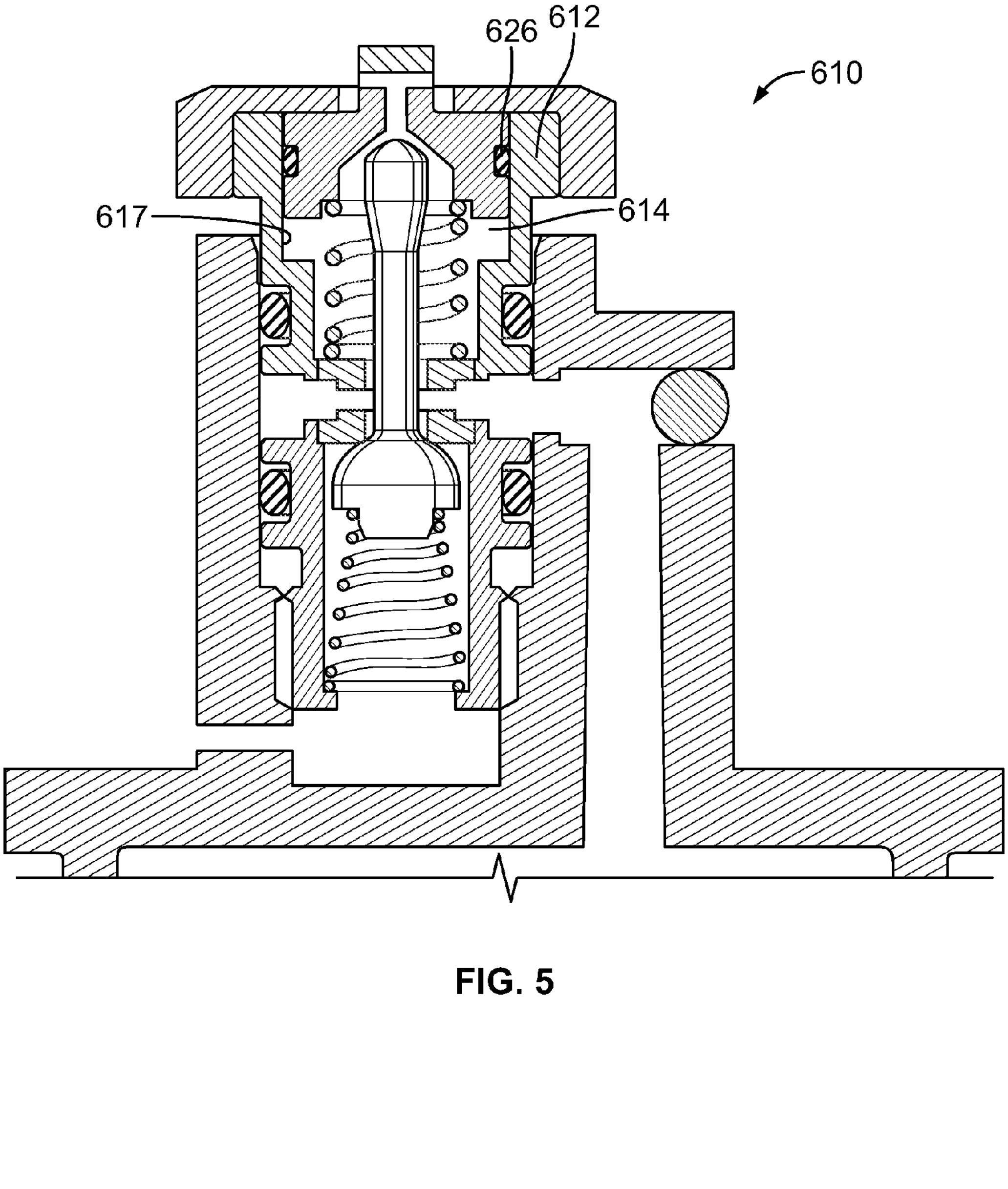
FIG. 5 is a cut-away illustration of an example signal stage.

Additionally, FIG. 5 illustrates a signal stage 610 to further improve pneumatic control device performance. That is, in combination with the low signal stage pressure of the example pneumatic control device of FIG. 4, the present example signal stage 610 has a reduced feedback area to further reduce feedback forces on a sensor. The example signal stage relay 610 includes a relay body 612 having smaller internal diameter relative to the feedback passage 614 and/or the previously described relay body 312 of the example pneumatic control device 200 depicted in FIG. 3. The corresponding feedback passage 614 is also reduced in diameter to provide a sealing engagement with a seal or an o-ring 626. As previously described, the fluid pressure in the feedback passage 614 acts upon the inner surface 617 and the seal or o-ring 626 to apply a negative feedback force on the linkage to provide a proportional output from a control device. As a result, the reduced feedback area provides a reduced feedback force to a sensor coupled to a pneumatic control device.

The combination of low pressure signal stage and the reduced feedback-area signal stage may improve device stability for feedback sensors with high gain. By controlling the feedback area in a predetermined manner and configuring signal stage pressure independent of amplifier stage pressure, a pneumatic control device can be adapted to stabilize a broad variety of displacement-style level controllers.

In summary it should be appreciated that the example device disclosed herein substantially eliminates the transition bleed of the control device fashioning a dual-stage pneumatic relay that positively closes an exhaust port of the relay before a supply port opens. Additionally, a seal or an o-ring of a signal stage relay provides significant negative feedback area to counteract or offset the lever force on the signal stage relay in a throttling or proportioning manner while providing increased gain to improve overall system performance.

Although certain example apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A dual-stage fluid flow control apparatus, comprising:

a signal stage having a proportional output, the signal stage having a signal stage relay including a supply plug having a first end adjacent a valve seat and a second end adjacent an exhaust seat, a signal stage input post adapted to couple the signal stage to a control device, a first biasing element to urge a seat load across the supply plug toward either the valve seat or the exhaust seat, and a second biasing element to bias the exhaust seat away from the second end of the supply plug; and an amplifier stage having an amplifier stage relay operatively connected to the signal stage via a signal passage, the amplifier stage having a fluid supply responsive member adapted to move a relay member to provide an amplified fluid supply output such that a shift in the seat load across the valve seat and the exhaust seat provides a predetermined engagement of either the valve seat to the first end of the supply plug or the exhaust seat to the second end of the supply plug to provide either a proportional or snap-acting and a direct or reverse acting output of the amplifier stage relative to an input signal at the signal stage input post.

2. The apparatus of claim 1, wherein the shift in seat load provides an adjustment in either valve seat leakage or exhaust seat leakage to adjust a pressure balance across the signal stage and the amplifier stage in proportion to a sensor signal at the signal stage input post.

3. The apparatus of claim 1, wherein a first stabilizing pressure regulator provides a fluid supply to the signal stage and a second stabilizing pressure regulator provides a fluid supply to the amplifier stage.

4. The apparatus of claim 1, wherein the signal stage provides a throttling mode.

5. The apparatus of claim 4, wherein the first end of the supply plug is substantially in contact with the valve seat and the second end of the supply plug is substantially in contact with the exhaust seat at a quiescent point in the throttling mode.

6. A dual-stage fluid flow control apparatus, comprising:

a signal stage having a proportional output, the signal stage having a signal stage relay including a supply plug having a first end adjacent a valve seat and a second end adjacent an exhaust seat, a signal stage input post adapted to couple the signal stage to a control device and a biasing element to urge a seat load across the supply plug toward either the valve seat or the exhaust seat; and an amplifier stage having an amplifier stage relay operatively connected to the signal stage via a signal passage, the amplifier stage having a fluid supply responsive member adapted to move a relay member to provide an amplified fluid supply output such that a shift in the seat load across the valve seat and the exhaust seat provides a predetermined engagement of either the valve seat to the first end of the supply plug or the exhaust seat to the second end of the supply plug to provide either a proportional or snap-acting and a direct or reverse acting output of the amplifier stage relative to an input signal at the signal stage input post, wherein a fluid pressure in a signal passage acts upon an inner surface of a signal stage o-ring to apply a negative feedback force to provide the proportional output of the amplifier stage.

7. The apparatus of claim 6, wherein a force equal to a product of the pressure within the signal passage and an effective sealing area defined by the inner surface of the signal stage o-ring is applied in opposition to an input force on a signal stage input post.

8. A dual-stage, fluid flow control apparatus comprising:

a signal stage having a proportional output, the signal stage having a signal stage relay including a supply port, a supply plug having a first end adjacent a valve seat and a second end adjacent an exhaust seat, a signal stage input post adapted to couple the signal stage to a control device, a first spring to bias a seat load across the supply plug toward either the valve seat or the exhaust seat, a seal operatively coupled to the supply plug such that the seal at least partially defines a feedback area that yields a fluid pressure feedback force to the exhaust seat, and a spring operatively coupled to the supply plug to overcome a frictional force created by the seal; and an amplifier stage having an amplifier stage relay operatively connected to the signal stage via a signal passage, the amplifier stage relay having a fluid supply responsive member adapted to move a relay member to provide an amplified fluid supply output, a shift in the seat load across supply plug of the signal stage closes the exhaust seat of the signal stage prior to opening the valve seat of the signal stage to substantially eliminate a transition bleed in the signal stage.

9. The apparatus of claim 8, wherein the first end of the supply plug is substantially in contact with the valve seat and the second end of the supply plug is substantially in contact with the exhaust seat at a quiescent point in a throttling mode.

10. The apparatus of claim 8, wherein the fluid pressure feedback force is proportional to the signal stage output pressure.

11. The apparatus of claim 8, wherein the exhaust seat includes an input post to contact an input linkage such that a bias force of the spring is to maintain contact between the input linkage and the input post to substantially eliminate a dead band between input linkage motion and exhaust seat motion.

12. A dual-stage, fluid flow control apparatus comprising:

a signal stage having a signal stage relay that includes a supply plug operatively associated with a valve seat at a first end and an exhaust seat at a second end, the supply plug positioned at least partially within a body of the signal stage relay defining a feedback passage;

a seal positioned within an annular groove of the exhaust seat between an outer surface of the exhaust seat and an inner surface of the feedback passage to provide a frictional force to the exhaust seat; and an amplifier stage having an amplifier stage relay fluidly coupled to the signal stage via a signal passage, the amplifier stage relay having a fluid supply responsive member adapted to move a relay member to provide an amplified fluid supply output based on a signal output provided by the signal stage.

13. The apparatus of claim 12, further comprising a biasing element to provide a seat load across the supply plug toward the valve seat or the exhaust seat.

14. The apparatus of claim 12, wherein a shift in the seat load across the supply plug of the signal stage closes the exhaust seat of the signal stage prior to opening the valve seat of the signal stage to substantially eliminate a transition bleed in the signal stage.

15. The apparatus of claim 12, wherein the fluid pressure feedback force is proportional to the signal stage output.

16. The apparatus of claim 12, further comprising a signal stage relay housing such that the signal stage relay housing and the seal define a signal stage module that provides a predetermined feedback area adapted to operate with a predetermined linkage force.

17. The apparatus of claim 12, wherein the signal stage provides a throttling mode, wherein a first end of the supply plug is substantially in contact with the valve seat and a second end of the supply plug is substantially in contact with the exhaust seat at a quiescent point in the throttling mode.

18. A dual-stage, fluid flow control apparatus comprising:

a signal stage having a signal stage relay that includes a supply plug operatively associated with a valve seat at a first end and an exhaust seat at a second end;

a seal operatively coupled to the supply plug such that the seal provides a feedback area to apply a fluid pressure feedback force to the exhaust seat;

a spring operatively coupled to the supply plug to overcome a frictional force created by the seal; and an amplifier stage having an amplifier stage relay fluidly coupled to the signal stage via a signal passage, the amplifier stage relay having a fluid supply responsive member adapted to move a relay member to provide an amplified fluid supply output based on a signal output provided by the signal stage.

19. The apparatus of claim 18, wherein the exhaust seat includes an input post to contact an input linkage such that a bias force of the spring is to maintain contact between the input linkage and the input post to substantially reduce a dead band between input linkage motion and exhaust seat motion.

* * * * *